United States Patent
Kifuku et al.

(10) Patent No.: US 7,624,838 B2
(45) Date of Patent: Dec. 1, 2009

(54) ELECTRIC POWER STEERING CONTROL APPARATUS

(75) Inventors: Takayuki Kifuku, Tokyo (JP); Masaki Matsushita, Tokyo (JP); Hiroyuki Kozuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 296 days.

(21) Appl. No.: 11/493,598

(22) Filed: Jul. 27, 2006

(65) Prior Publication Data

US 2007/0199764 A1 Aug. 30, 2007

(30) Foreign Application Priority Data

Feb. 28, 2006 (JP) ............... 2006-053001

(51) Int. Cl.
*B62D 5/04* (2006.01)
(52) U.S. Cl. ............... 180/446; 180/444; 180/443; 701/41; 701/42; 701/43
(58) Field of Classification Search ........... 180/443, 180/446, 444; 701/41, 42, 43
See application file for complete search history.

(56) References Cited

U.S. PATENT DOCUMENTS

| | | | | |
|---|---|---|---|---|
| 5,928,298 | A * | 7/1999 | Matsuoka et al. | 701/41 |
| 6,338,022 | B1 | 1/2002 | Shinmura et al. | |
| 6,427,104 | B1 * | 7/2002 | Matsushita et al. | 701/41 |
| 6,639,379 | B2 * | 10/2003 | Matsushita et al. | 318/727 |
| 7,086,495 | B2 * | 8/2006 | Tsutsui | 180/443 |
| 7,226,069 | B2 * | 6/2007 | Ueda et al. | 180/446 |
| 7,342,366 | B2 * | 3/2008 | Ueda et al. | 318/254.1 |

FOREIGN PATENT DOCUMENTS

| | | |
|---|---|---|
| JP | 04-274969 | 9/1992 |
| JP | 11-147479 A | 6/1999 |
| JP | 2001001925 | 1/2001 |
| JP | 2001-158366 A | 6/2001 |
| JP | 2003-312504 A | 11/2003 |
| JP | 2003-348900 | 12/2003 |
| JP | 2004-129402 | 4/2004 |
| JP | 2004-173372 A | 6/2004 |
| JP | 2004-217084 | 8/2004 |

* cited by examiner

*Primary Examiner*—Lesley D Morris
*Assistant Examiner*—Marlon A Arce
(74) *Attorney, Agent, or Firm*—Sughrue Mion, PLLC (57) ABSTRACT

An electric power steering control apparatus can limit a motor impression voltage thereby to maintain an appropriate motor output even upon occurrence of a failure of a motor current detection circuit or a motor current feedback control system. The apparatus includes a motor that generates an assist force to the steering system, an input processing section that takes in a steering torque signal from a torque sensor, an output processing section that drives the motor, and a processing unit that provides an instruction to the output processing section based on the steering torque signal. The processing unit includes an impression voltage calculation section that calculates an amount of operation to the motor in accordance with the steering torque signal, and an impression voltage limiting section that limits the impression voltage to predetermined limit values or less corresponding to the direction of the steering torque signal.

16 Claims, 8 Drawing Sheets

ELECTRIC POWER STEERING CONTROL APPARATUS

BACKGROUND OF THE INVENTION

1. Field of the Invention

The present invention relates to an electric power steering control apparatus which outputs an assist force from a motor to a steering system of a vehicle in accordance with the steering torque applied by a driver of the vehicle to a steering wheel, and more particularly, it relates to a new technique for limiting a voltage impressed to the motor in an appropriate manner upon occurrence of abnormality in a motor current control system.

2. Description of the Related Art

There has hitherto been known an electric power steering control apparatus which, in order to generate an optimal steering assist force from a motor, is provided with various kinds of sensor sections (a torque sensor, a motor current detection circuit, etc.), a target current calculation section, a maximum current calculation section, and a current control section, and the target current calculation section calculates various kinds of target currents for the motor based on a steering torque signal, a vehicle speed signal, a motor voltage signal, and so on (see, for example, a first patent document: Japanese examined patent application publication No. 11-147479).

In addition, to make the motor generate an appropriate steering assist force even if abnormality occurs in the motor voltage signal or the like, the maximum current calculation section serves to limit the individual target currents in such a manner that the sum total of the individual target currents becomes an upper limit value of predetermined target currents based on the steering torque signal, etc.

As a result, in cases where the torque sensor or a motor terminal voltage detection circuit fails, the target current of the motor is limited so as to maintain an appropriate steering assist force from the motor.

Further, in order to make the motor current detected by the motor current detection circuit coincide with the target motor current, the current control section determines a voltage to be impressed to the motor while performing feedback control thereof.

In the above-mentioned known electric power steering control apparatus, there is no concept of limiting the polarity of the impression voltage, and hence, no provision is made for limiting the impression voltage. As a result, there is the following problem. That is, when there occurs a failure of the motor current detection circuit, miscalculation of control values or quantities for motor current feedback control, etc., the current supplied to the motor is interrupted. However, there is a possibility that an inappropriate voltage continues to be impressed to the motor over a period of time until the current supply to the motor is actually interrupted or stopped.

SUMMARY OF THE INVENTION

Accordingly, the present invention is intended to solve the problem as referred to above, and has for its object to obtain an electric power steering control apparatus which is capable of maintaining an appropriate motor output by limiting a voltage to be impressed to a motor even when there occurs a failure of a motor current detection circuit, miscalculation in motor current feedback control.

Bearing the above object in mind, according to the present invention, there is provided an electric power steering control apparatus including: a torque sensor that detects a steering torque applied by a driver to a steering system; a motor that generates an assist force to the steering system; an input processing section that takes in a steering torque signal from the torque sensor; an output processing section that drives the motor; and a processing unit that provides an instruction to the output processing section based on the steering torque signal. The processing unit includes: an impression voltage calculation section that calculates an impression voltage to the motor in accordance with the steering torque signal; and an impression voltage limiting section that limits the impression voltage to a predetermined limit value or less corresponding to the direction of the steering torque signal.

According to the present invention, it is possible to maintain an appropriate motor output by limiting a voltage to be impressed to a motor even when there occurs a failure of a motor current detection circuit, miscalculation of control values or quantities for motor current feedback control.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

(Limitation Of Brush Motor Current PI Controller Output) Claims 1, 2 and 7

Figure 1:
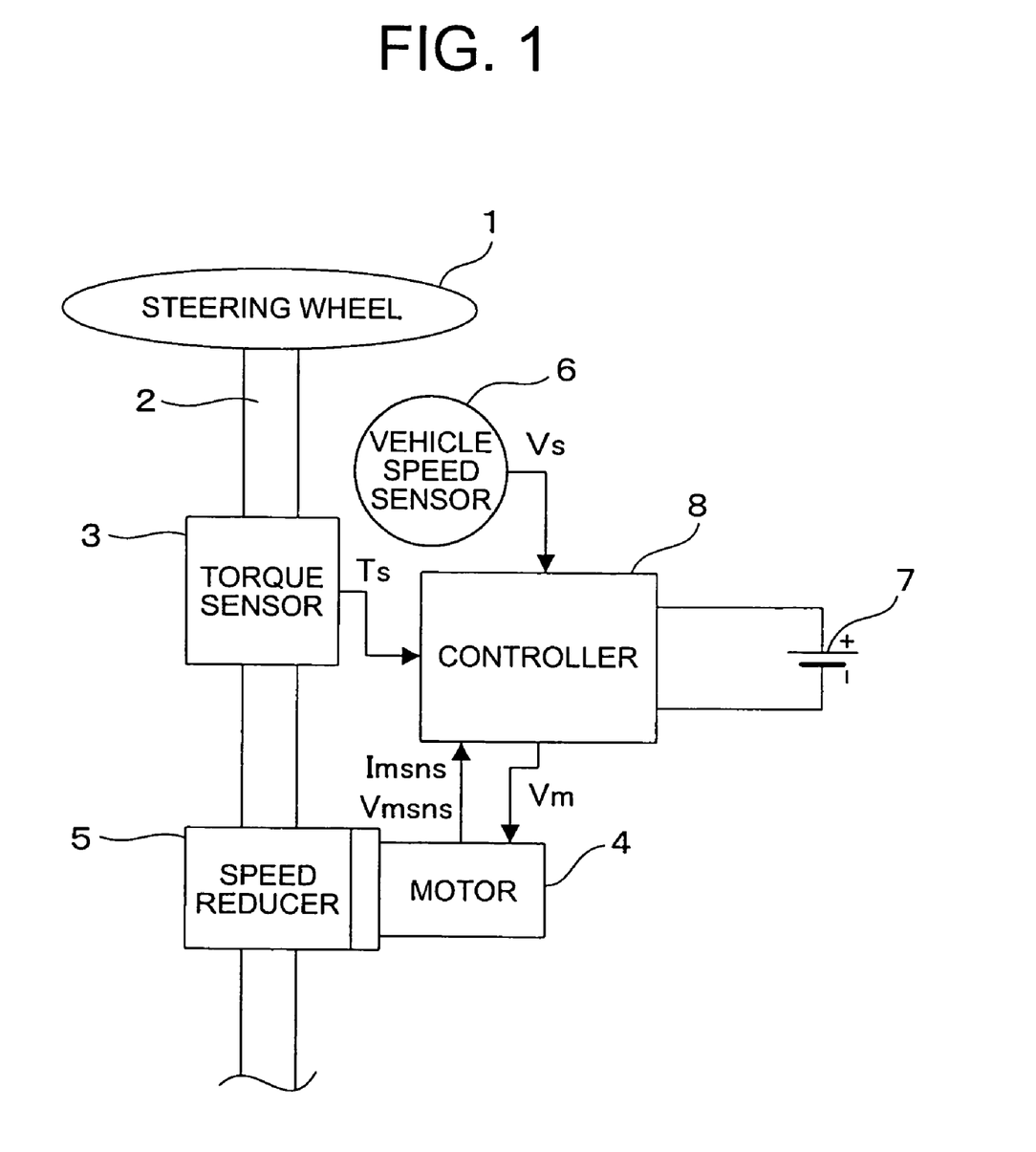
FIG. 1 is a block diagram schematically showing an electric power steering control apparatus according to a first embodiment of the present invention.

Referring first to FIG. 1, there is schematically showing an electric power steering control apparatus according to a first embodiment of the present invention.

In FIG. 1, a steering wheel 1, which constitutes a steering system of a vehicle, is mounted on one end of a steering shaft 2 so that it is steered by a driver of the vehicle for example. A torque sensor 3 is mounted on the steering shaft 2 for detecting a steering force applied to the steering wheel 1 by the driver. A steering torque signal Ts from the torque sensor 3 is input to a controller 8 (to be described in detail later) that includes a microcomputer.

On the other hand, a motor 4 is mounted on the steering shaft 2 through a speed reducer 5. The motor 4 is in the form of a DC motor of the brush commutation type for example, and is driven to operate under the control of the controller 8, whereby an assist force (assist torque) is generated in the steering shaft 2 of the steering system for assisting the steering force of the driver. The speed reducer 5 serves to reduce the assist torque output from the motor 4 in an appropriate manner and transmit it to the steering shaft 2. A vehicle speed sensor 6 detects the travel speed of the vehicle (vehicle speed), and inputs it to the controller 8 as a vehicle speed signal Vs. An on-board battery 7 constitutes a drive power supply for the controller 8.

The controller 8 calculates a target current Im* based on the steering torque signal Ts from the torque sensor 3 and the vehicle speed signal Vs from the vehicle speed sensor 6, and then calculates an amount of operation Vm* corresponding to the target current Im*, whereby an impression voltage Vm corresponding to the amount of operation Vm * is impressed to the motor 4 for driving thereof.

In addition, the motor 4 is provided with a current detection circuit and a voltage detection circuit (to be described later), which serve to feed back their detection signals to the controller 8 as a motor current Imsns and a motor voltage Vmsns, respectively.

Figure 2:
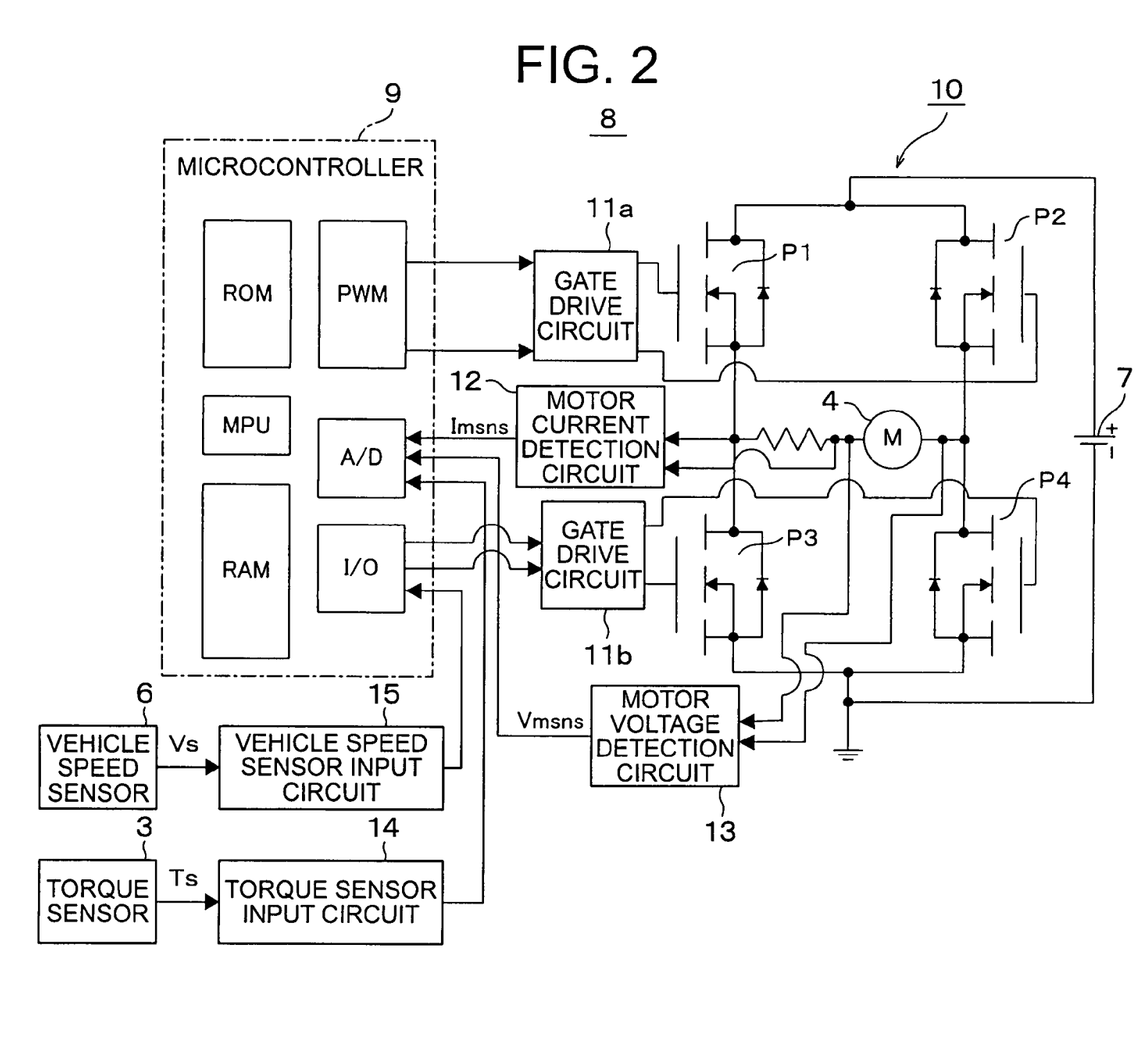
FIG. 2 is a circuit block diagram showing the detailed hardware configuration of a controller in FIG. 1.

FIG. 2 is a circuit block diagram that shows the detailed hardware configuration of the controller 8, wherein the like parts or components as those described above (see FIG. 1) are identified by the same symbols while omitting a detailed description thereof.

In FIG. 2, the controller 8 includes a microcontroller 9 in the form of a main component, a motor drive circuit 10, a pair of gate drive circuits 11a, 11b, a motor current detection circuit 12, a motor voltage detection circuit 13, a torque sensor input circuit 14, and a vehicle speed sensor input circuit 15.

The microcontroller 9 includes a microprocessor MPU in the form of a main component, a memory section ROM in which a control program for operating the microprocessor MPU is stored, a memory section RAM used for calculation processing of the microprocessor MPU, a PWM modulator PWM for outputting a PWM signal to the gate drive circuit 11a, an AD converter A/D that converts and analog signals from the detection circuits 12, 13 and the torque sensor input circuit 14 into digital signal and takes them in, and an input and output section I/O that outputs a drive pulse to the gate drive circuit 11b and takes in a pulse signal from the vehicle speed sensor input circuit 15.

The motor drive circuit 10 comprises four power MOS transistors P1 through P4 which are connected to form a bridge circuit, with diodes being connected in antiparallel to the power MOS transistors P1 through P4, respectively. The gate drive circuit 11a PWM drives the positive side power MOS transistors P1, P2 in the motor drive circuit 10, and the gate drive circuit 11b drives the ground side power MOS transistors P3, P4 in the motor drive circuit 10 to turn on and off. The motor current detection circuit 12 detects the armature current of the motor 4 as a motor current Imsns, and inputs it to the microcontroller 9. The motor voltage detection circuit 13 detects the terminal voltage of the motor 4 as a motor voltage Vmsns, and inputs it to the microcontroller 9.

The torque sensor input circuit 14 constitutes an input processing section for taking in the steering torque signal Ts from the torque sensor 3, and inputs the steering torque signal Ts to the microcontroller 9.

Similarly, the vehicle speed sensor input circuit 15 inputs the vehicle speed signal Vs from the vehicle speed sensor 6 to the microcontroller 9. The motor drive circuit 10 and the gate drive circuits 11a, 11b together constitute an output processing section for driving the motor 4. The microprocessor MPU in the microcontroller 9 constitutes a processing unit for providing, under its software operation, an instruction to the output processing section based on the steering torque signal Ts.

Figure 3:
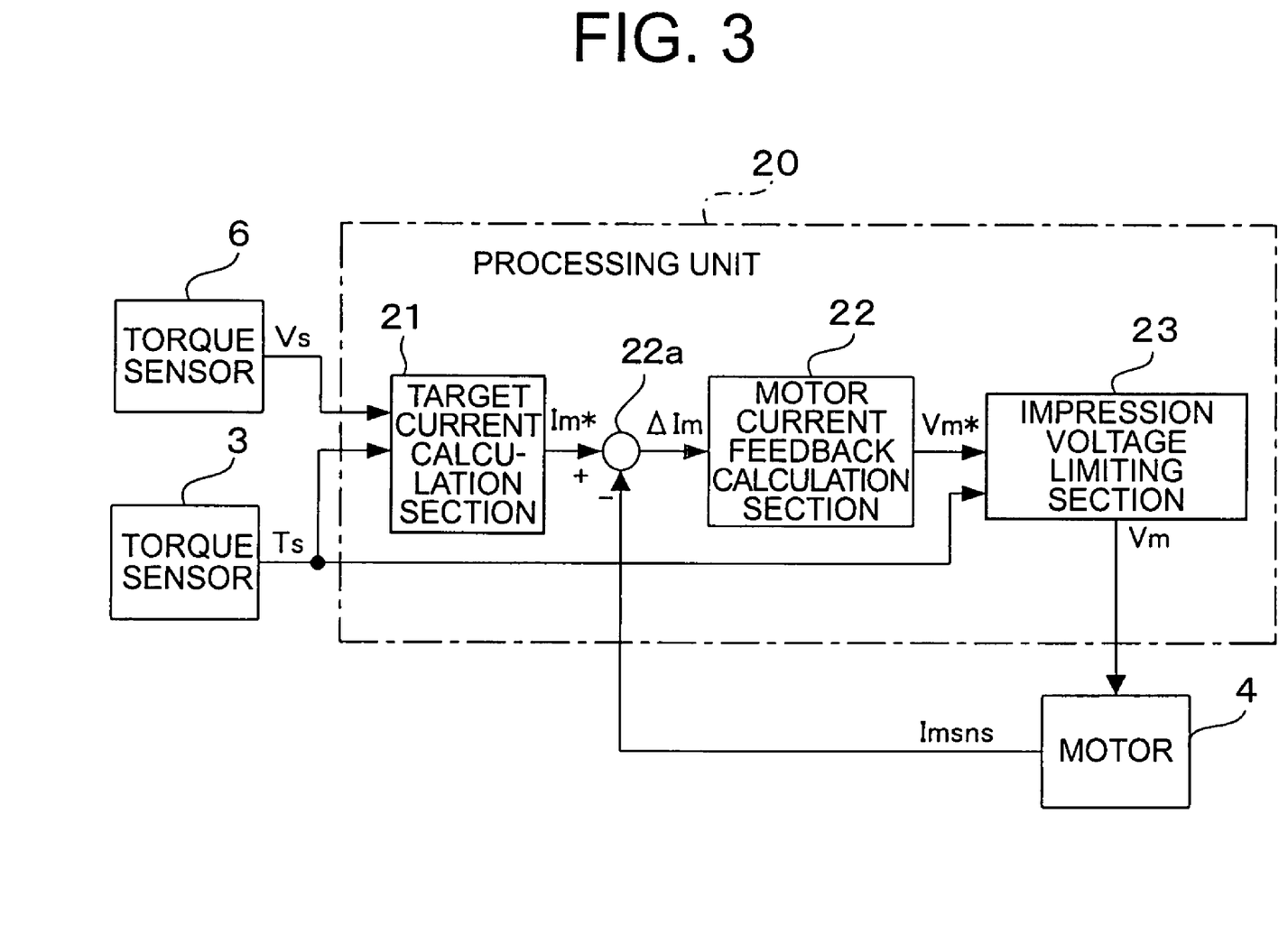
FIG. 3 is a functional block diagram showing a processing unit in the form of software in a microcontroller in FIG. 2.

FIG. 3 is a functional block diagram that shows a processing unit 20 in the form of software in the microcontroller 9. In FIG. 3, the processing unit 20 is provided with a target current calculation section 21, a motor current feedback calculation section 22 having a subtracter 22a, and an impression voltage limiting section 23. The target current calculation section 21 and the motor current feedback calculation section 22 together constitute an impression voltage calculation section that calculates, as an amount of operation Vm*, the impression voltage Vm to the motor 4 in accordance with the steering torque signal Ts. The target current calculation section 21 generates the target current Im* based on the vehicle speed signal Vs from the vehicle speed sensor 6 and the steering torque signal Ts from the torque sensor 3 in accordance with a predetermined characteristic (e.g., see FIG. 4). The subtracter 22a calculates a current deviation ΔIm (=Im*−Imsns) between the target current Im* and the motor current Imsns from the motor current detection circuit 12.

The motor current feedback calculation section 22 generates the amount of operation Vm* for making the motor current Imsns coincide with the target current Im* (i.e., current deviation ΔIm=0) based on the current deviation ΔIm by using a feedback control algorithm such as, for example, PI control or the like. The impression voltage limiting section 23 outputs the impression voltage Vm that is limited according to the predetermined characteristic (e.g., see FIG. 5) based on the amount of operation Vm* and the steering torque signal Ts. The impression voltage Vm output from the impression voltage limiting section 23 is PWM modulated by the PWM modulator PWM in the microcontroller 9 to drive the power MOSFETs P1, P2 in the drive circuit 10 through the gate drive circuit 11a. In addition, the impression voltage Vm acts as a voltage to drive the power MOSFETs P3, P4 in the drive circuit 10 to turn on and off through the gate drive circuit 11b.

Figure 4:
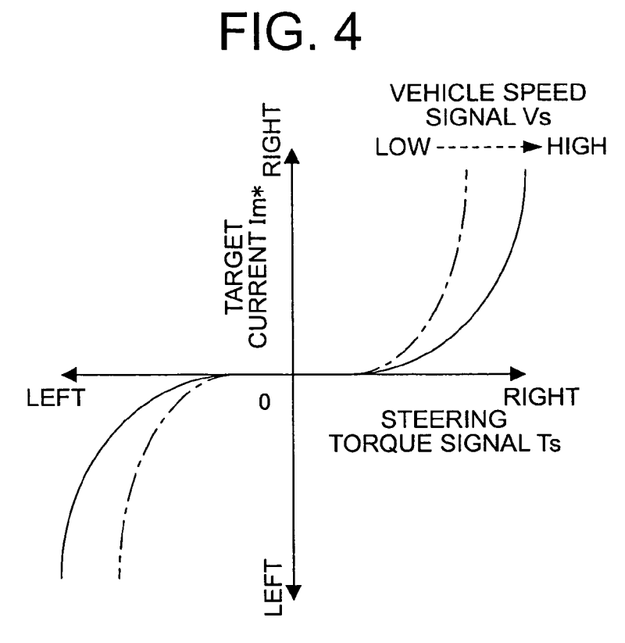
FIG. 4 is an explanatory view showing the calculation characteristic of a target current used for the processing of a target current calculation section in FIG. 3.

FIG. 4 is an explanatory view that shows the calculation characteristic of the target current Im* used for the processing of the target current calculation section 21.

In FIG. 4, the axis of abscissa represents the left and right target current Im*, and the axis of ordinate represents the left and right steering torque signal Ts. When the vehicle speed signal Vs shows low speed, the target current Im* is decided based on the steering torque signal Ts according to a characteristic that follows an alternate long and short dash line, whereas when the vehicle speed signal Vs shows high speed, the target current Im* is decided based on the steering torque signal Ts according to a characteristic that follows a solid line.

Figure 5:
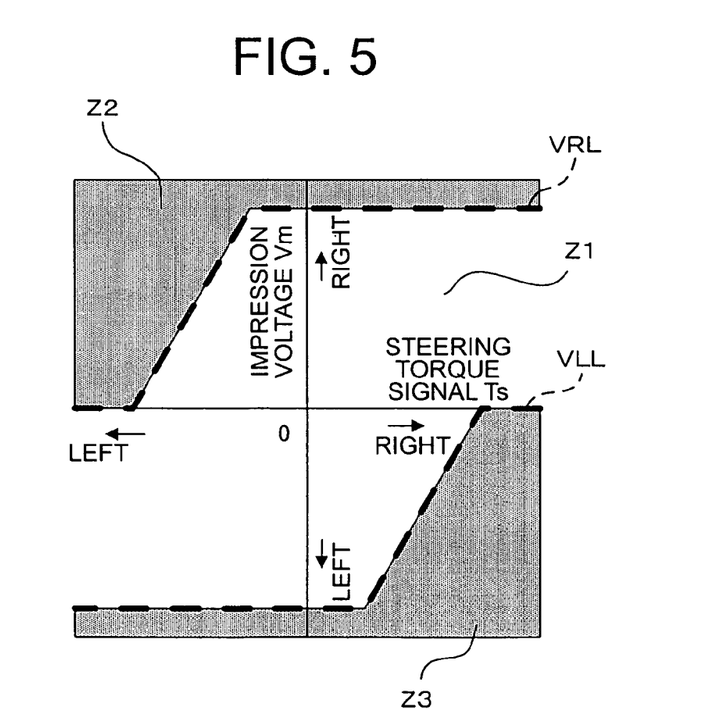
FIG. 5 is an explanatory view showing the limiting characteristic of an impression voltage used for the processing of an impression voltage limiting section in FIG. 3.

FIG. 5 is an explanatory view that shows the limiting characteristic of the impression voltage Vm used for the processing of the impression voltage limiting section 23.

In FIG. 5, the axis of abscissa represents the left and right steering torque signal Ts, and the axis of ordinate represents the left and right impression voltage Vm. In addition, a right limit value VRL and a left limit value VLL are set as predetermined limit values in accordance with the right and left directions of the steering torque signal Ts. In order for the voltage in an abnormal region Z2 or Z3 to become a value in a normal region Z1, the impression voltage Vm is limited to a value equal to or less than the right limit value VRL or the left limit value VLL (in either case, the voltage value being considered as an absolute value) in accordance with the right or left direction of the steering torque signal Ts.

Next, more detailed reference will be made to the voltage suppression processing of the impression voltage limiting section 23 in FIG. 3 while referring to FIG. 4 and FIG. 5.

In FIG. 3, the amount of operation Vm* calculated by the motor current feedback calculation section 22 is subjected to the influence of external disturbances such as the counter electromotive force of the motor 4, the voltage variation of the battery 7, etc., so the relation between the amount of operation Vm* and the target current Im* does not become a simple proportional relation.

However, in case where the target current Im* is large, the amount of operation Vm* also tends to become large, and the relation between the steering torque signal Ts and the target current Im* is in the relation of a monotone increase, as shown in FIG. 4. Thus, when the steering torque signal Ys is generally large, as shown in the normal region Z1 in FIG. 5, the amount of operation Vm* also tends to be large.

On the other hand, in FIG. 5, the impression voltage Vm in each of the abnormal regions Z2, Z3 is a value which causes an anti-assist current due to miscalculation, circuit failure, etc., or a value due to the influence of electromagnetic noise, etc., and hence is considered to be a voltage value which can cause an unnecessary operation of the steering control system. Accordingly, by limiting the amount of operation Vm* corresponding to the impression voltage Vm to a value within the normal region Z1 in FIG. 5, the impression voltage limiting section 23 can suppress an inappropriate impression voltage Vm without unnecessarily limiting the impression voltage when the amount of operation Vm* is normal.

Next, specific reference will be made to the above-mentioned processing operation of the impression voltage limiting section 23 while referring to a flow chart of FIG. 6 together with FIG. 5.

Figure 6:
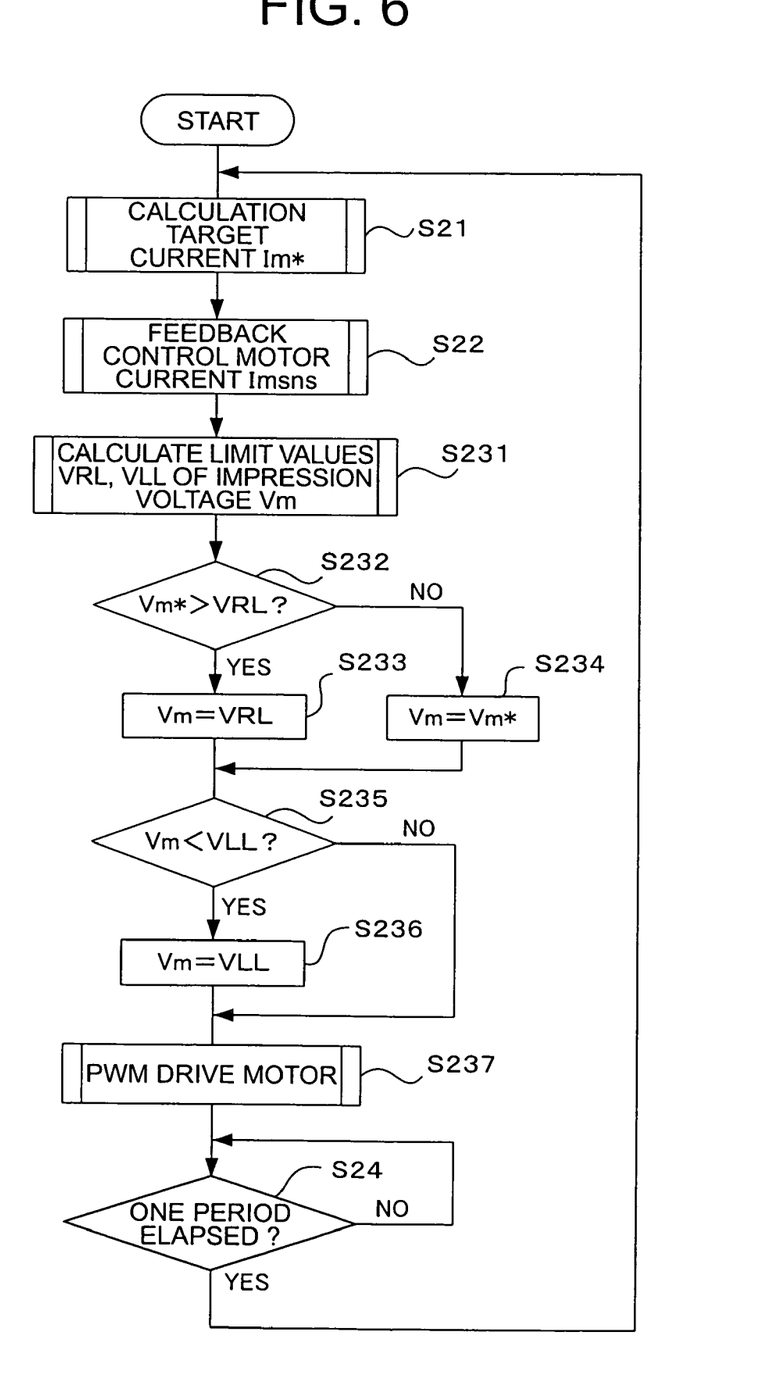
FIG. 6 is a flow chart illustrating the processing operation of an impression voltage limiting section of the electric power steering control apparatus according to the first embodiment of the present invention.

Here, note that a program shown in FIG. 6 is held in the memory section ROM built into the microcontroller 9 in FIG. 2, and is called and executed by the microprocessor MPU in a periodic manner.

In FIG. 6, step S21 corresponds to the processing operation of the target current calculation section 21, and step S22 corresponds to the processing operation of the motor current feedback calculation section 22, and steps S231 through S237 corresponds to the processing operation of the impression voltage limiting section 23.

First of all, the target current calculation section 21 calculates the target current Im* (step S21). Then, the motor current feedback calculation section 22 calculates the motor current Imsns in a feedback manner based on the current deviation ΔIm (=Im*−Imsns) calculated by the subtracter 22a, and also calculates the amount of operation Vm* (step S22).

Thereafter, the impression voltage limiting section 23 PWM drives the motor 4 by the impression voltage Vm that is properly limited by the processing of the following steps S231 through S237. At this time, it is assumed that the right limit value VRL and the left limit value VLL for distinguishing or identifying the normal region Z1 are stored as a data table in the memory section RAM inside the microcontroller 9, as shown in FIG. 5.

First of all, the impression voltage limiting section 23 acquires, through table calculation, the right limit value VRL and the left limit value VLL based on the steering torque signal Ts while referring to the data table of FIG. 5 (step S231).

Subsequently, the amount of operation Vm* calculated in step S22 is compared with the right limit value VRL, so that it is determined whether the amount of operation Vm* is larger than the right limit value VRL (step S232).

When it is determined as Vm*>VRL in step S232 (that is, YES), the impression voltage Vm is set equal to the right limit value VRL (i.e., Vm=VRL) so as to make the impression voltage Vm less than or equal to the right limit value VRL (step S233). As a result, the impression voltage Vm is limited to a value equal to or less than the right limit value VRL.

On the other hand, when it is determined as Vm*≦VRL in step S232 (that is, NO), the impression voltage Vm is held equal to the amount of operation Vm* (i.e., Vm=Vm*) (step S234).

Subsequently, similar to the above-mentioned processing (steps S232 through S234) based on the right limit value VRL, the impression voltage limiting section 23 performs the limiting processing (steps S235, S236) for the left limit value VLL. First, it is determined whether the impression voltage Vm set in step S233 or S234 is smaller than the left limit value VLL (in the case of the left side being made a negative polarity) (step S235), and when it is determined as Vm<VLL (that is, YES), the impression voltage Vm is set equal to the left limit value VLL (i.e., Vm=VLL) so as to make the impression voltage Vm higher than or equal to the left limit value VLL (step S236). As a result, the impression voltage Vm is limited to a value equal to or larger than the left limit value VLL. Here, it is assumed that in step S235, the value of the left impression voltage Vm in FIG. 5 is not handled as an absolute value but a value of negative polarity.

On the other hand, when it is determined as Vm≧VLL in step S235 (that is, NO), the control flow advances to the following processing without executing the limiting processing (step S236) since it is already clear that the impression voltage Vm is a value within the normal region Z1. In other words, when the amount of operation Vm* is in the range between the respective limit values VLL and VRL (in the normal region Z1), the impression voltage Vm set in step S234 is held, and hence the impression voltage Vm becomes equal to the amount of operation Vm*. The impression voltage Vm is limited within the range of the normal region Z1 of FIG. 5 according to the processing in the above steps S231 through S237.

Finally, the impression voltage limiting section 23 outputs the impression voltage Vm limited within the normal region Z1 through the PWM modulator PWM in the microcontroller 9, the gate drive circuit 11a and the drive circuit 10 (see FIG. 2) thereby to PWM drive the motor 4 (step S237).

In addition, the processing unit 20 determines whether a predetermined one period or cycle has elapsed (step S24), and when it is determined that the one period has not elapsed (that is, NO), a return is performed to step 24 where a predetermined time is waited so that the above steps S21 through S237 can be executed at the predetermined period, whereas when it is determined in step S24 that the one period has elapsed (that is, YES), a return is performed to step S21 where the above-mentioned processing (steps S21 through S237) is repeated at the predetermined period.

As described above, the electric power steering control apparatus according to the first embodiment of the present invention includes the torque sensor 3 that detects the steering torque applied by the driver to the steering system (the steering wheel 1 and the steering shaft 2), the motor 4 that generates an assist force to the steering system, the input processing section (the torque sensor input circuit 14) that takes in the steering torque signal Ts from the torque sensor 3, the output processing section (the motor drive circuit 10 and the gate drive circuits 11a, 11b) that drives the motor 4, and the processing unit 20 that provides an instruction to the output processing section based on the steering torque signal Ts. The processing unit 20 includes the impression voltage calculation section (the target current calculation section 21 and the motor current feedback calculation section 22) that calculates the impression voltage Vm to the motor 4 in accordance with the steering torque signal Ts, and the impression voltage limiting section 23 that limits the impression voltage Vm to the predetermined limit values VRL, VLL or less in accordance with the direction of the steering torque signal Ts.

Thus, the amount of operation Vm* (corresponding to the impression voltage Vm) calculated by the motor current feedback calculation section 22 is limited within the predetermined range. (the normal region Z1) based on the direction and magnitude of the steering torque signal Ts by limiting the amplitude of the impression voltage by voltage polarity limitation according to the steering torque signal Ts. As a result, even if the amount of operation Vm* becomes an inappropriate value due to the miscalculation of the microcontroller 9, etc., the impression voltage Vm is always limited in the vicinity of a normal value (a value within the normal region Z1), so it is possible to suppress any adverse influence on the behavior of the steering control system.

In addition, the limit value includes a first limit value (the right limit value VRL when the steering torque signal Ts represents the right direction) which is in the same direction as that of the steering torque signal Ts, and a second limit value (the left limit value VLL when the steering torque signal Ts represents the right direction) which is in a direction opposite to that of the steering torque signal Ts, as shown in the voltage limiting characteristic of FIG. 5, wherein when the voltage value is considered as an absolute value, the first limit value is set to be larger than or equal to the second limit value.

That is, a limit value in the opposite direction to the steering torque signal Ts is smaller or equal in absolute value to a limit value in the same direction to the steering torque signal Ts. Thus, it is possible to permit the driving of the motor 4 in the same direction to the steering torque signal Ts while preventing the motor 4 from being driven in the opposite direction to the steering torque signal Ts. Accordingly, an adverse influence to the behavior of the steering control system can be further suppressed while maintaining the steer assisting function to some degree.

Further, the impression voltage calculation section (the target current calculation section 21 and the motor current feedback calculation section 22) and the impression voltage limiting section 23, which together constitute the processing unit 20, are formed in the same microcontroller 9, so the hardware configuration thereof can be simplified.

Embodiment 2

Although in the above-mentioned first embodiment, there has been illustrated the case where the DC motor of the brush commutation type is used as the motor 4, a three-phase motor of the brushless type may instead be used.

In this case, the impression voltage calculation section in the processing unit 20 calculates, as the impression voltage Vm, a magnetic flux dividing voltage for controlling the magnetic flux of the motor 4 and a torque dividing voltage for controlling the output torque of the motor 4, and the impression voltage limiting section 23 is configured in such a manner as to limit the torque dividing voltage to a limit value or below.

In general, the three-phase motor of the brushless type is controlled by converting a three-phase alternating voltage into a d-axis voltage (magnetic flux dividing voltage) and a q-axis voltage (torque dividing voltage), but according to this second embodiment of the present invention, an operational effect similar to the above can be achieved by limiting the q-axis voltage to a limit value or below by means of the impression voltage limiting section 23.

Embodiment 3

In the above-mentioned first and second embodiments, the control programs for the impression voltage calculation section (the target current calculation section 21 and the motor current feedback calculation section 22) and the impression voltage limiting section 23, which together constitute the processing unit 20 (see FIG. 3), are held in the memory section ROM (see FIG. 2) in the one and same microcontroller 9, but an additional microcontroller (not shown) similar to the microcontroller 9 may be provided in the controller 8 (see FIG. 1), so that the above-mentioned sections or control programs can be individually and separately stored and executed in the two microcontrollers.

Thus, according to this third embodiment of the present invention, the motor current feedback calculation sections 22 and the impression voltage limiting sections 23 will operate as a redundant system by the use of the plurality of microcontrollers. As a result, the probability that the motor current feedback calculation sections 22 and the impression voltage limiting sections 23 fail at the same time and do not operate as the redundant system can be reduced, thus making it possible to achieve a further strict and highly reliable supervisory function.

Embodiment 4

Figure 7:
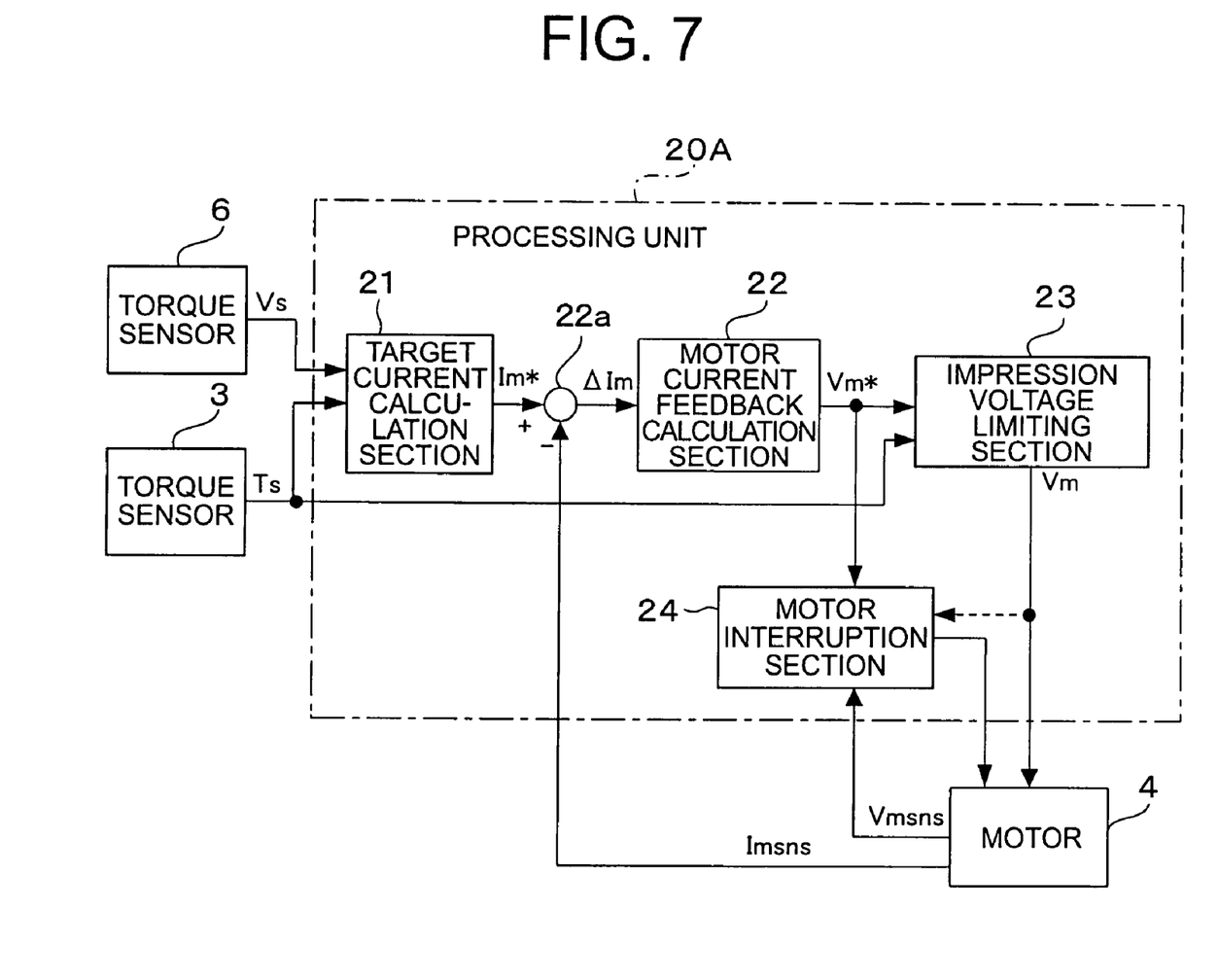
FIG. 7 is a functional block diagram showing a processing unit in the form of software in a microcontroller of an electric power steering control apparatus according to a fourth embodiment of the present invention.

In the above-mentioned first through third embodiments, the impression voltage Vm is simply limited within the predetermined range (the normal region Z1) by means of the impression voltage limiting section 23 in the processing unit 20, but as shown in FIG. 7, a motor interruption section 24 may be provided in a processing unit 20A, so that the current supplied to the motor 4 can be interrupted in case where the impression voltage (the amount of operation Vm*) calculated by the impression voltage calculation section (the motor current feedback calculation section 22) or the impression voltage Vm limited by the impression voltage limiting section 23 (i.e., limited by the respective limit values VRL, VLL) exhibits an abnormal value.

FIG. 7 is a functional block diagram showing a processing unit 20A of an electric power steering control apparatus according to a fourth embodiment of the present invention, wherein like parts or sections as those described above (see FIG. 3) are identified by the same symbols or by the same symbols with "A" affixed to their ends, while omitting a detailed explanation thereof.

In FIG. 7, the processing unit 20A is in the form of a software configuration (control programs) in the microcontroller 9 (see FIG. 2), as stated above. The processing unit 20A is provided with the motor interruption section 24 which is associated with at least one of the motor current feedback calculation section 22 and the impression voltage limiting section 23.

The motor interruption section 24 functions as a failure latch section for the motor 4, and operates as follows. That is, for example, in case where the amount of operation Vm* calculated by the motor current feedback calculation section 22 deviates remarkably from the normal region Z1 so a voltage deviation between the amount of operation Vm* and at least one of the limit values (VRL, VLL) exhibits larger than or equal to a maximum permissible value, it is assumed that the processing unit 20A is in a state of the occurrence of abnormality, and the current supplied to the motor 4 is interrupted. The state of interruption of the motor 4 caused by the motor interruption section 24 is held until the microcontroller 9 is reactivated.

As described above, according to this fourth embodiment of the present invention, in case where the processing unit 20A fails and the amount of operation Vm* exhibits an abnormal value, the provision of the motor interruption section 24 serves to prevent an inappropriate voltage from being impressed to the motor 4, thus making it possible to achieve failsafe processing.

In addition, when the amount of operation Vm* has continuously deviated from the normal region Z1 (i.e., exceeded the limit value VRL or VLL) over a predetermined time or more, the motor interruption section 24 may interrupt the current supplied to the motor 4. That is, when the state that the impression voltage to the motor 4 calculated by the impression voltage calculation section exceeds a limit value of the impression voltage limiting section 23 continues for the predetermined time or more, the motor interruption section 24 interrupts the current supplied to the motor 4, thereby performing failsafe processing as stated above.

Moreover, the motor interruption section 24 reads the motor voltage Vmsns detected by the motor voltage detection circuit 13 as the impression voltage Vm limited by the impression voltage limiting section 23 (or reads the impression voltage Vm directly from the impression voltage limiting section 23), and interrupts the current supplied to the motor 4 to similarly perform failsafe processing when the voltage deviation between the impression voltage Vm and a limit value (VRL or VLL) exhibits the predetermined value or more. In this case, it is possible to prevent the impression of an inappropriate voltage to the motor 4 even if the impression voltage limiting section 23 fails.

Further, the motor interruption section 24 may be formed in the same microcontroller 9 (the processing unit 20A) in which the impression voltage limiting section 23 is provided, or may be formed in a different microcontroller which is additionally provided, and in which the impression voltage limiting section 23 is not formed.

Embodiment 5

Figure 8:
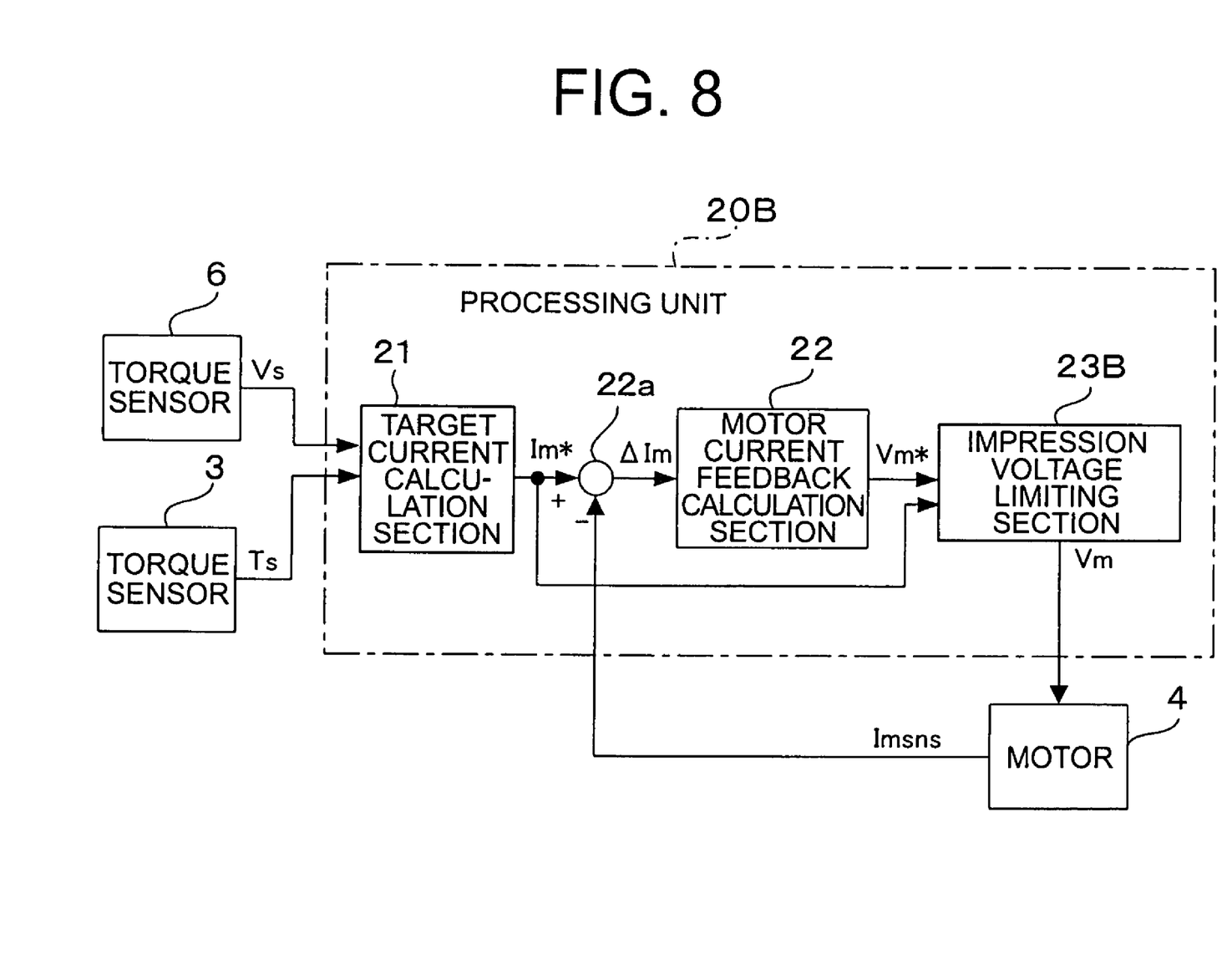
FIG. 8 is a functional block diagram showing a processing unit in the form of software in a microcontroller of an electric power steering control apparatus according to a fifth embodiment of the present invention.

In the above-mentioned first through fourth embodiments, the steering torque signal Ts is input to the impression voltage limiting section 23 (see FIG. 3 and FIG. 7), so that the final impression voltage Vm to the motor 4 is obtained by limiting the impression voltage Vm (the amount of operation Vm*) with the use of the voltage limiting characteristic (see FIG. 5) based on the steering torque signal Ts, but as shown in FIG. 8, the target current Im* may be input to an impression voltage limiting section 23B, so that the final impression voltage Vm can be obtained by limiting the amount of operation Vm* with the use of a voltage limiting characteristic (see FIG. 9) based on the target current Im*.

FIG. 8 is a functional block diagram that shows a processing unit 20B of an electric power steering control apparatus according to a fifth embodiment of the present invention, wherein like parts or sections similar to those described above (see FIG. 3) are identified by the same symbols or by the same symbols with "B" affixed to their ends, while omitting a detailed explanation thereof. In FIG. 8, the processing unit 20B is in the form of a software configuration (control programs) in the microcontroller 9 (see FIG. 2), as stated above.

Figure 9:
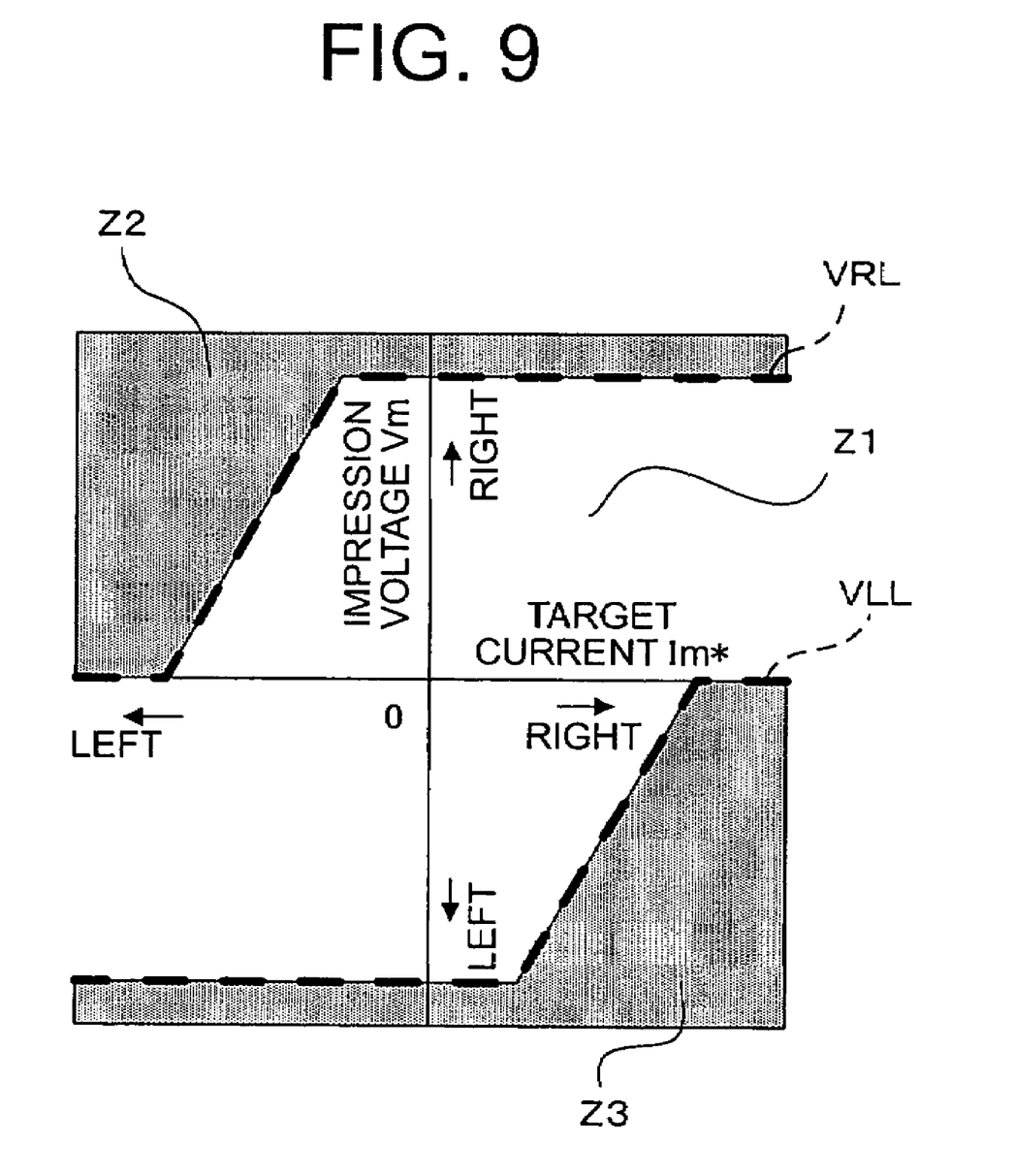
FIG. 9 is an explanatory view showing the limiting characteristic of an impression voltage according to an impression voltage limiting section in FIG. 8.

Also, FIG. 9 is an explanatory view that shows the voltage limiting characteristic used in the impression voltage limiting section 23B in the processing unit 20B, wherein the like parts or sections as those described above (see FIG. 5) are identified by the same symbols while omitting a detailed description thereof.

In FIG. 9, the voltage limiting characteristic shown therein is similar to that in FIG. 5 except for that the axis of abscissa represents the left and right "target current Im*". In this case, the impression voltage limiting section 23B serves to limit the final impression voltage Vm to the motor 4 to predetermined limit values (VRL, VLL) or less in accordance with the target current Im*. In addition, similarly as stated above, a first limit value in the same direction as that of the target current Im* is set to be larger than or equal to a second limit value that is in a direction opposite to that of the target current Im*.

As described above, according to the fifth embodiment of the present invention, the impression voltage limiting section 23B limits the impression voltage Vm within the normal region Z1 based on the voltage limiting characteristic of FIG. 9. As a result, it is possible to maintain an appropriate motor output even when there occurs a failure of the motor current detection circuit 12, miscalculation of control values or quantities for feedback control of the motor current Imsns.

Here, note that in case where the motor 4 is a three-phase motor, the target current calculation section 21 calculates, as the target current Im*, the magnetic flux dividing voltage for controlling the magnetic flux of the motor 4 and the torque dividing voltage for controlling the output torque of the motor 4, and the impression voltage calculation section (the motor current feedback calculation section 22) calculates, as the impression voltage Vm (the amount of operation Vm*), the above-mentioned magnetic flux dividing voltage and the above-mentioned torque dividing voltage. Also, the impression voltage limiting section 23B limits the torque dividing voltage to a limit value or less corresponding to the torque dividing current. As a result, the q-axis voltage can be limited to the limit value or below, as stated above.

While the invention has been described in terms of preferred embodiments, those skilled in the art will recognize that the invention can be practiced with modifications within the spirit and scope of the appended claims.

What is claimed is:

1. An electric power steering control apparatus comprising:
  a torque sensor that detects a steering torque applied by a driver to a steering system;
  a motor that generates an assist force to said steering system;
  an input processing section that takes in a steering torque signal from said torque sensor;
  an output processing section that drives said motor; and
  a processing unit that provides an instruction to said output processing section based on said steering torque signal;
  wherein said processing unit includes:
  an impression voltage calculation section that calculates an impression voltage to said motor in accordance with said steering torque signal; and
  an impression voltage limiting section that limits said impression voltage to a predetermined limit value or less corresponding to both the direction and the magnitude of said steering torque signal, wherein said impression voltage limiting section prevents said impression voltage from exceeding said predetermined limit value, which is a predetermined upper limit, such that said impression voltage is confined within a predetermined normal impression voltage region.

2. The electric power steering control apparatus as set forth in claim 1, wherein
said limit value includes a first limit value in the same direction as that of said steering torque signal and a second limit value in a direction opposite to that of said steering torque signal; and
said first limit value is larger than or equal to said second limit value.

3. The electric power steering control apparatus as set forth in claim 1, wherein
said motor comprises a three-phase motor;
said impression voltage calculation section calculates, as said impression voltage, a magnetic flux dividing voltage for controlling a magnetic flux of said motor and a torque dividing voltage for controlling an output torque of said motor; and
said impression voltage limiting section limits said torque dividing voltage to said limit value or less.

4. An electric power steering control apparatus comprising:
a torque sensor that detects a steering torque applied by a driver to a steering system;
a motor that acts on said steering system;
an input processing section that takes in a steering torque signal from said torque sensor;
an output processing section that drives said motor; and
a processing unit that provides an instruction to said output processing section based on said steering torque signal;
wherein said processing unit includes:
a target current calculation section that calculates a target current supplied to said motor in accordance with said steering torque signal; and
an impression voltage calculation section that calculates an impression voltage to said motor; and
an impression voltage limiting section that limits said impression voltage to a predetermined limit value or less corresponding to both the direction and the magnitude of said target current,
wherein said impression voltage limiting section prevents said impression voltage from exceeding said predetermined limit value, which is a predetermined upper limit, such that said impression voltage is confined within a predetermined normal impression voltage region.

5. The electric power steering control apparatus as set forth in claim 4, wherein
said limit value includes a first limit value in the same direction as that of said target current and a second limit value in a direction opposite to that of said target current; and
said first limit value is larger than or equal to said second limit value.

6. The electric power steering control apparatus as set forth in claim 5, wherein
said motor comprises a three-phase motor;
said target current calculation section calculates, as said target current, a magnetic flux dividing voltage for controlling a magnetic flux of said motor and a torque dividing voltage for controlling an output torque of said motor; and
said impression voltage calculation section calculates, as said impression voltage, a magnetic flux dividing voltage for controlling a magnetic flux of said motor and a torque dividing voltage for controlling an output torque of said motor; and
said impression voltage limiting section limits said torque dividing voltage to said limit value or less corresponding to said torque dividing current.

7. The electric power steering control apparatus as set forth in claim 1, wherein
said impression voltage calculation section and said impression voltage limiting section are formed in the same microcontroller.

8. The electric power steering control apparatus as set forth in claim 1, wherein
said impression voltage calculation section and said impression voltage limiting section are formed in different microcontrollers, respectively.

9. The electric power steering control apparatus as set forth in claim 1, wherein
said processing unit includes a motor interruption section: and
said motor interruption section interrupts a current supplied to said motor when the impression voltage calculated by said impression voltage calculation section or the impression voltage limited by said impression voltage limiting section exhibits an abnormal value.

10. The electric power steering control apparatus as set forth in claim 9, wherein
said motor interruption section interrupts a current supplied to said motor when a voltage deviation between the impression voltage calculated by said impression voltage calculation section and said limit value exhibits a maximum permissible value or more.

11. The electric power steering control apparatus as set forth in claim 9, wherein said motor interruption section interrupts a current supplied to said motor when the impression voltage calculated by said impression voltage calculation section continuously exceeds said limit value over a predetermined time or more.

12. The electric power steering control apparatus as set forth in claim 9, wherein
said motor interruption section interrupts a current supplied to said motor when a voltage deviation between said limit value and the impression voltage limited by said limit value exhibits a predetermined value or more.

13. The electric power steering control apparatus as set forth in claim 9, wherein
said impression voltage limiting section and said motor interruption section are formed in the same microcontroller.

14. The electric power steering control apparatus as set forth in claim 9, wherein
said impression voltage limiting section and said motor interruption section are formed in different microcontrollers, respectively.

15. The electric power steering control apparatus as set forth in claim 1, wherein if said impression value exceeds said predetermined limit value, said impression voltage limiting section sets said impression voltage to said predetermined limit value corresponding to said direction of said steering torque signal.

16. The electric power steering control apparatus as set forth in claim 4, wherein if said impression value exceeds said predetermined limit value, said impression voltage limiting section sets said impression voltage to said predetermined limit value corresponding to said direction of said steering torque signal.

* * * * *